United States Patent
Ygartua et al.

(10) Patent No.: US 10,551,166 B2
(45) Date of Patent: Feb. 4, 2020

(54) OPTICAL MEASUREMENT OF A HIGHLY ABSORBING FILM LAYER OVER HIGHLY REFLECTIVE FILM STACKS

(71) Applicant: KLA-Tencor Corporation, Milpitas, CA (US)

(72) Inventors: Carlos L. Ygartua, San Jose, CA (US); Shankar Krishnan, Santa Clara, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 16/150,268

(22) Filed: Oct. 2, 2018

(65) Prior Publication Data

US 2019/0107384 A1    Apr. 11, 2019

Related U.S. Application Data

(60) Provisional application No. 62/571,100, filed on Oct. 11, 2017.

(51) Int. Cl.
G01B 11/06    (2006.01)

(52) U.S. Cl.
CPC ...... *G01B 11/0625* (2013.01); *G01B 2210/56* (2013.01)

(58) Field of Classification Search
CPC ................................................ G01B 2210/56
See application file for complete search history.

(56) References Cited

U.S. PATENT DOCUMENTS

| | | |
|---|---|---|
| 5,166,752 A | 11/1992 | Spanier et al. |
| 5,608,526 A | 3/1997 | Piwonka-Corle et al. |
| 5,808,738 A | 9/1998 | Garcia-Rubio |
| 5,859,424 A | 1/1999 | Norton et al. |
| 6,429,943 B1 | 8/2002 | Opsal et al. |

(Continued)

FOREIGN PATENT DOCUMENTS

WO    2016187579 A1    11/2016

OTHER PUBLICATIONS

International Search Report dated Apr. 5, 2019, for PCT Application No. PCT/US2018/054893 filed on Oct. 8, 2018 by KLA-Tencor Corporation, 3 pages.

*Primary Examiner* — Yara B Green
(74) *Attorney, Agent, or Firm* — Spano Law Group; Joseph S. Spano (57) ABSTRACT

Apparatus and methods for performing optically based film thickness measurements of highly absorbing films (e.g., high-K dielectric films) with improved measurement sensitivity are described herein. A highly absorbing film layer is fabricated on top of a highly reflective film stack. The highly reflective film stack includes one or more nominally identical sets of multiple layers of different, optically contrasting materials. The highly reflective film stack gives rise to optical resonance in particular wavelength ranges. The high reflectance at the interface of the highly absorbing film layer and the highly reflective film stack increases measured light intensity and measurement sensitivity. The thickness and optical dispersion of the different material layers of the highly reflective film stack are selected to induce optical resonance in a desired wavelength range. The desired wavelength range is selected to minimize absorption by the highly absorbing film under measurement.

20 Claims, 8 Drawing Sheets

(56) References Cited

U.S. PATENT DOCUMENTS

| | | | |
|---|---|---|---|
| 6,633,831 B2 * | 10/2003 | Nikoonahad | G01N 21/211 257/E21.53 |
| 6,734,967 B1 | 5/2004 | Piwonka-Corle et al. | |
| 6,816,570 B2 | 10/2004 | Janik et al. | |
| 6,859,278 B1 | 2/2005 | Johs et al. | |
| 6,895,075 B2 | 5/2005 | Yokhin et al. | |
| 6,972,852 B2 | 12/2005 | Opsal et al. | |
| 7,478,019 B2 | 1/2009 | Zangooie et al. | |
| 7,755,764 B2 * | 7/2010 | Kwak | G01B 11/0625 250/372 |
| 7,826,071 B2 | 11/2010 | Shchegrov et al. | |
| 7,907,264 B1 | 3/2011 | Krishnan | |
| 7,929,667 B1 | 4/2011 | Zhuang et al. | |
| 7,933,026 B2 | 4/2011 | Opsal et al. | |
| 8,525,993 B2 | 9/2013 | Rabello et al. | |
| 8,860,937 B1 | 10/2014 | Dziura et al. | |
| 9,291,554 B2 | 3/2016 | Kuznetsov et al. | |
| 9,310,290 B2 | 4/2016 | Wang et al. | |
| 9,915,522 B1 | 3/2018 | Jiang et al. | |
| 2001/0048706 A1 * | 12/2001 | Deichsel | G02F 1/3523 372/107 |
| 2007/0187606 A1 | 8/2007 | Adel et al. | |
| 2010/0121607 A1 * | 5/2010 | Nabatova-Gabain | G01B 11/065 702/172 |
| 2012/0250032 A1 | 10/2012 | Wilde et al. | |
| 2013/0114085 A1 | 5/2013 | Wang et al. | |
| 2014/0111791 A1 | 4/2014 | Manassen et al. | |
| 2014/0172394 A1 | 6/2014 | Kuznetsov et al. | |
| 2014/0222380 A1 | 8/2014 | Kuznetsov et al. | |
| 2014/0297211 A1 | 10/2014 | Pandev et al. | |
| 2014/0316730 A1 | 10/2014 | Shchegrov et al. | |
| 2014/0375981 A1 * | 12/2014 | Wang | G01N 21/9501 356/51 |
| 2014/0375983 A1 | 12/2014 | Wolf et al. | |
| 2015/0042984 A1 | 2/2015 | Pandev et al. | |
| 2015/0046118 A1 | 2/2015 | Pandev et al. | |
| 2015/0076586 A1 | 3/2015 | Rabkin et al. | |
| 2015/0193926 A1 | 7/2015 | Berlatzky et al. | |
| 2015/0198435 A1 | 7/2015 | Vaid et al. | |
| 2015/0204664 A1 | 7/2015 | Bringoltz et al. | |
| 2016/0139032 A1 | 5/2016 | Rampoldi et al. | |
| 2016/0161245 A1 | 6/2016 | Fu et al. | |
| 2017/0030707 A1 | 2/2017 | Srocka | |
| 2017/0199457 A1 * | 7/2017 | Hatakeyama | G03F 7/0397 |

* cited by examiner

OPTICAL MEASUREMENT OF A HIGHLY ABSORBING FILM LAYER OVER HIGHLY REFLECTIVE FILM STACKS

CROSS REFERENCE TO RELATED APPLICATION

The present application for patent claims priority under 35 U.S.C. § 119 from U.S. provisional patent application Ser. No. 62/571,100, filed Oct. 11, 2017, the subject matter of which is incorporated herein by reference in its entirety.

TECHNICAL FIELD

The described embodiments relate to metrology systems and methods, and more particularly to methods and systems for improved measurement of semiconductor structures.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. Optical metrology techniques offer the potential for high throughput without the risk of sample destruction. A number of optical metrology based techniques including scatterometry, reflectometry, and ellipsometry implementations and associated analysis algorithms are commonly used to characterize critical dimensions, film thicknesses, composition, overlay and other parameters of nanoscale structures.

In many semiconductor fabrication applications, a relatively thick, highly absorbing layer is deposited directly on a substrate (e.g., silicon substrate) or on top of a set of production film stacks fabricated on a substrate. In one example, a carbon layer having a thickness of one micrometer or more is deposited on a silicon substrate or on set of production film stacks deposited on the silicon substrate.

Optical measurements of the thickness of a relatively thick, highly absorbing layer are difficult due to the amount of light loss that occurs as the illumination light propagates through the layer thickness to the bottom of the layer and as the reflected light propagates back through the layer thickness to the top of the layer. As a result many optical techniques suffer from low signal-to-noise ratios (SNRs), as only a small fraction of the illumination light is able to reach the bottom of the thick, absorbing film, and reflect upwards to the detector. Thus, many available high-throughput metrology techniques are unable to reliably perform film thickness measurements of thick, absorbing film layers.

For example, a relatively thick carbon layer absorbs practically all measurement light in the ultraviolet and visible spectra. In response, attempts have been made to perform optical thickness measurements of a relatively thick carbon layer using infrared (IR) illumination to increase measurement sensitivity. IR illumination is employed because carbon is less absorbing in the IR spectrum compared to UV and visible spectra. Unfortunately, the reflectance from the silicon substrate in the IR spectrum is very low. This limits measurement sensitivity. Although, typical product stacks have higher reflectance in the IR spectrum, the measurement is complicated by the product stack and it has proven difficult to extract a measurement signal indicative of carbon layer thickness from signals arising from the product stack.

In summary, semiconductor fabrication applications involving thick, highly absorbing film layers impose difficult requirements on optical metrology systems. Optical metrology systems must meet high precision and accuracy requirements for the thickness measurement of thick, highly absorbing films at high throughput. Improved film architectures and metrology systems and methods are desired to overcome these limitations.

SUMMARY

Apparatus and methods for performing optically based film thickness measurements of highly absorbing films (e.g., high-K dielectric films) with improved measurement sensitivity are described herein.

The highly absorbing film layer under measurement is fabricated on top of a highly reflective film stack. The highly reflective film stack includes one or more nominally identical sets of multiple layers of different, optically contrasting materials. The highly reflective film stack gives rise to optical resonance in particular wavelength ranges. The high reflectance at the interface of the highly absorbing film layer and the highly reflective film stack increases the light intensity transmitted through the highly absorbing film and onto the detector of the spectrometer. In this manner, the amplitude of the measured signal indicative of the thickness of the highly absorbing film is increased relative to the measurement noise floor. As a result, measurement sensitivity to thickness of the highly absorbing film is increased.

In one aspect, the thickness and optical dispersion (i.e., refractive index) of the different materials in the highly reflective film stack are selected to induce optical resonance in a desired wavelength range. In this manner, measurement sensitivity is significantly higher than measurement sensitivity associated with measurement of a highly absorbing film fabricated directly on a silicon substrate or typical product stacks.

In a further aspect, a spectroscopic ellipsometer, spectroscopic ellipsometer, or both, are employed to perform optical based film thickness measurements of a highly absorbing film fabricated on top one or more repeating sets of multiple layers of different, optically contrasting materials.

In another further aspect, IR wavelengths are employed to perform optical measurements of thickness of a highly absorptive amorphous carbon layer.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Apparatus and methods for optically based film thickness measurements of highly absorbing films (e.g., high-K dielectric films) with improved measurement sensitivity are described herein. The highly absorbing film layer under measurement is fabricated on top of a highly reflective film stack. The highly reflective film stack includes one or more nominally identical (i.e., within manufacturing tolerances), sets of multiple layers of different, optically contrasting materials. The highly reflective film stack gives rise to optical resonance in particular wavelength ranges. The high reflectance at the interface of the highly absorbing film layer and the highly reflective film stack increases the light intensity transmitted through the highly absorbing film and onto the detector of the spectrometer. In this manner, the amplitude of the measured signal indicative of the thickness of the highly absorbing film is increased relative to the measurement noise floor. As a result, measurement sensitivity to thickness of the highly absorbing film is increased.

In one aspect, the thickness and optical dispersion (i.e., refractive index) of the different materials in the highly reflective film stack are selected to induce optical resonance in a desired wavelength range. In some embodiments, the highly reflective film stack is optimized to exhibit reflectance approaching 1.0 in a desired wavelength range. In this manner, measurement sensitivity is significantly higher than measurement sensitivity associated with measurement of a highly absorbing film fabricated directly on a silicon substrate or typical product stacks.

Figure 1:
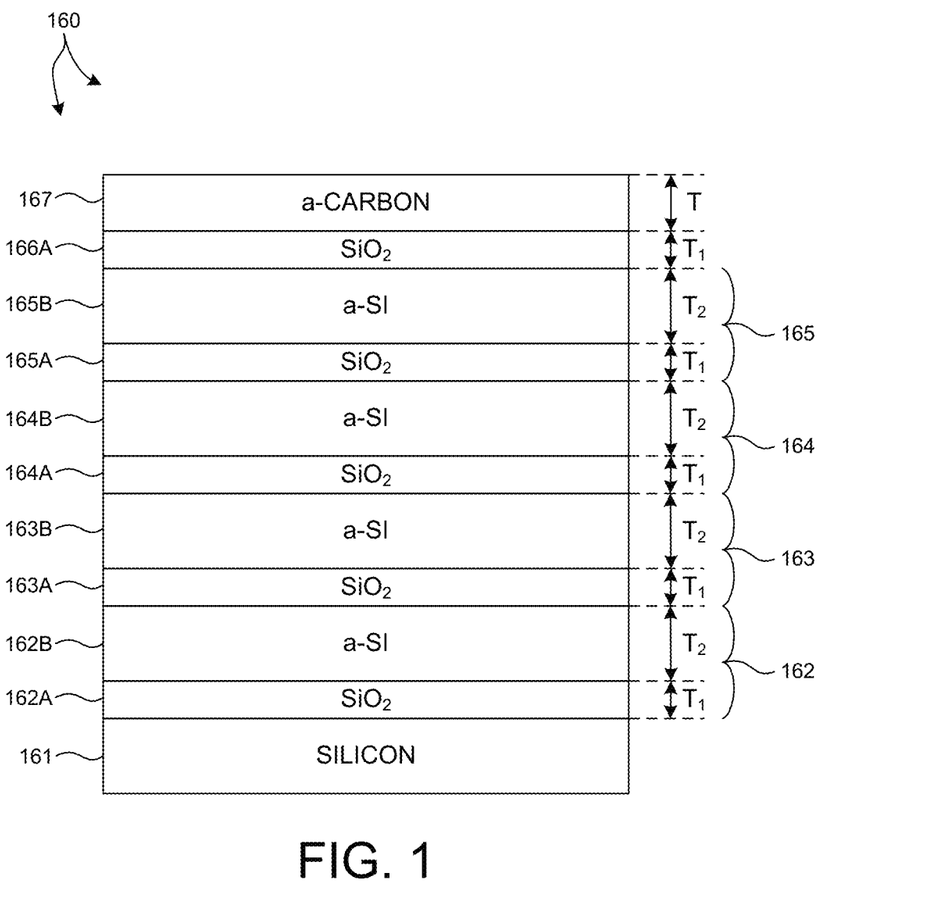
FIG. 1 is a diagram illustrative of film stack structure 160 including a substrate, a number of substantially identical, repeating layer sets disposed on the substrate, and a highly absorbing material layer disposed on the repeating layer sets.

FIG. 1 is an illustration depicting a substrate 161, a number of substantially identical, repeating layer sets 162-165 disposed on substrate 161, and a highly absorbing material layer 167 disposed on the repeating layer sets 162-165. Each of the substantially identical, repeating layer sets includes different material layers each having a different index of refraction. This increases optical contrast at each interface and amplifies the optical resonance effect.

In the embodiment depicted in FIG. 1, substrate 161 is a silicon substrate and highly absorbing material layer 167 is an amorphous carbon layer. Each repeating layer set includes a layer of silicon dioxide and a layer of amorphous silicon. The silicon dioxide layers 162A, 163A, 164A, 165A, and 166A are substantially identical. In other words, their material composition and thickness are identical within the limits of a semiconductor fabrication process. Similarly, the amorphous silicon layers 162B, 163B, 164B, and 165B are substantially identical. In other words, their material composition and thickness are identical within the limits of a semiconductor fabrication process. Although, each repeating layer set includes two different material layers (e.g., silicon dioxide and amorphous silicon), in general, each repeating layer set may include any number of different material layers. Although, four repeating layer sets are depicted in FIG. 1, in general, any number of repeating layer sets may be employed to exhibit optical resonance. In practice, the improved measurement sensitivity that results from employing more repeating layer sets is limited by no more than approximately eight or nine repeating layer sets. In general, using more than eight or nine repeating layer sets does not significantly improve measurement sensitivity.

In some embodiments, the thickness of one of the material layers is different from the thickness of another of the material layers of each repeating layer set. As depicted in FIG. 1, the thickness of each of the silicon dioxide layers 162A, 163A, 164A, 165A, and 166A is $T_1$ and the thickness of each of the amorphous silicon layers 162B, 163B, 164B, and 165B is $T_2$. In some other embodiments, the thickness of one of the material layers is the same as the thickness of another of the material layers of each repeating layer set.

Although highly absorbing layer 167 depicted as an amorphous carbon layer in FIG. 1, in general, any highly absorbing film may be contemplated within the scope of this patent document. A highly absorbing material is characterized by an extinction coefficient, K, and a thickness, T. In general, absorption increases as extinction coefficient, thickness, or both, increase. In some embodiments, a highly absorbing material layer is characterized by a product of extinction coefficient and thickness (i.e., K*T) having a value greater than 0.7 micrometers within the range of illumination wavelengths employed to perform a film thickness measurement of the highly absorbing material layer. In some embodiments, a highly absorbing material layer is characterized by a product of extinction coefficient and thickness (i.e., K*T) having a value greater than 1.0 micrometers within the range of illumination wavelengths employed to perform a film thickness measurement of the highly absorbing material layer.

In one example, the thickness of amorphous carbon layer 167 is 1800 nanometers. A typical extinction coefficient of amorphous carbon at illumination wavelengths in a range from 1800 nanometers to 2,500 nanometers is approximately 0.6-0.7. Thus, the product of extinction coefficient and thickness of the amorphous carbon layer is well above 0.7 micrometers. In one example, the thickness of each of the silicon dioxide layers 162A, 163A, 164A, 165A, and 166A is 2,500 nanometers and the thickness of each of the amorphous silicon layers 162B, 163B, 164B, and 165B is also 2,500 nanometers. This repeating set of layers below the highly absorbing amorphous carbon layer is a preferred embodiment for the measurement of an amorphous carbon layer with IR illumination including a range of wavelengths from 1,800-2,500 nanometers. Silicon dioxide and amorphous silicon layers are preferred for several reasons. Both materials are commonly deposited in the semiconductor industry and they do not have the potential to contaminate process chambers. In this sense, these materials are much preferred over many metals. In addition, the index of refraction of both materials offers good contrast. For example, the index of refraction of silicon dioxide is approximately 1.45 and the index of refraction of amorphous silicon is approximately 3.5. In addition, both silicon dioxide and amorphous silicon effectively do not absorb light at IR wavelengths (e.g., wavelengths between 1,000 and 2,500 nanometers). This promotes efficient optical resonance and high effective reflectivity of the repeating layer sets.

In some other embodiments, the amorphous silicon layers are replaced by nitride layers. However, repeating layer sets of oxide and nitride are not preferred for measurements with IR wavelengths. Nitride has an index of refraction of approximately 2.0, which results in a much lower contrast with an oxide layer than amorphous silicon. As a result, much thicker nitride layers would be required to induce resonance. Furthermore, nitride is absorptive in IR wavelengths, thus the overall reflectivity of repeating layer sets of oxide and nitride is much lower than layer sets of oxide and amorphous silicon at IR illumination wavelengths. However, at UV wavelengths (e.g., wavelengths in a range between 250-300 nanometers) or visible wavelengths (e.g., 400-500 nanometers), repeating layer sets of oxide and nitride may be employed. In one example, an optical resonance near 500 nanometers may be generated by repeating layer sets each having an oxide layer and a nitride layer with thickness between 450 nanometers to 500 nanometers.

Figure 2:
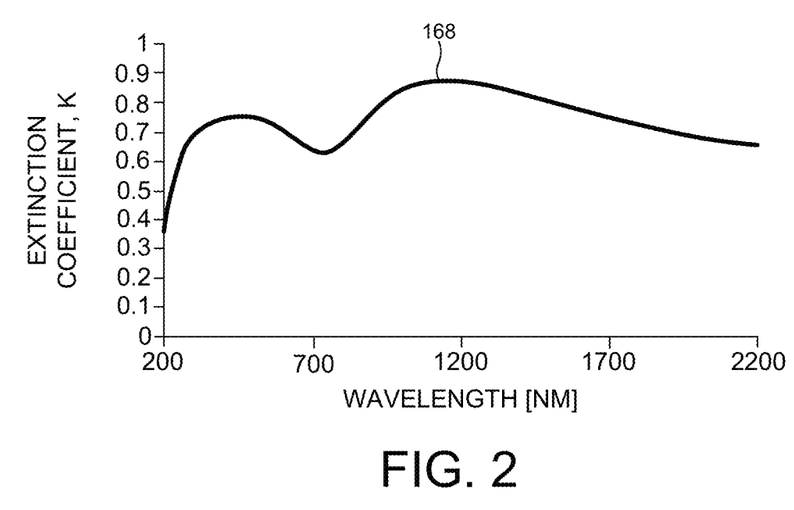
FIG. 2 depicts a plot of the extinction coefficient of an amorphous carbon film that is used as a hardmask material in etch steps of the semiconductor fabrication process.

FIG. 2 depicts a plot of the extinction coefficient of an amorphous carbon film used as a hardmask material in etch steps of the fabrication process for three dimensional NAND structures. Plotline 168 depicts the extinction coefficient as a function of wavelength. The extinction coefficient of the film maintains a relatively high value throughout the wavelength range from 200 nanometers to 2200 nanometers. Thus, the film is strongly absorbing even through the near IR spectral regions.

Figure 3:
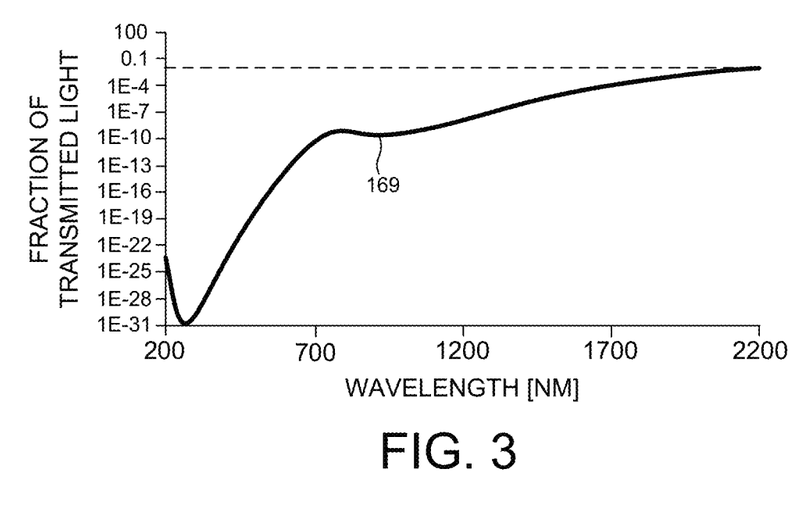
FIG. 3 depicts a plot of the fraction of light transmitted by the amorphous carbon film layer of FIG. 2 as measured by a spectroscopic reflectometer.

FIG. 3 depicts a plot of the fraction of light transmitted by an amorphous carbon film having a thickness of 1250 nanometers as measured by a reflectometer. Light reflected from the surface of the amorphous carbon film dominates internal reflections as relatively little light is transmitted by the film under measurement. Hence, the difficulty in measuring thickness of highly absorbing films.

The percentage of light transmitted by the amorphous carbon film layer remains extremely low throughout the range of wavelengths from 200 nanometers to 2200 nanometers. As illustrated in FIG. 3, the minimum wavelength required to collect approximately 0.05% of incident light is approximately 2000 nanometers. Below approximately 1800 nanometers the amount of collected signal is practically immeasurable.

FIGS. 2 and 3 illustrate the importance of employing short wavelength infrared light (e.g., 1400 nanometer to 3000 nanometer), and even mid wavelength infrared light (e.g., 3000 nanometer through 5000 nanometer, and beyond) to perform spectroscopic based measurements of important materials employed in semiconductor manufacture.

In a further aspect, a spectroscopic ellipsometer is employed to perform optical based film thickness measurements of a highly absorbing film fabricated on top one or more repeating sets of multiple layers of different, optically contrasting materials. In another further aspect, IR wavelengths are employed to perform optical measurements of thickness of a highly absorptive amorphous carbon layer.

Figure 4:
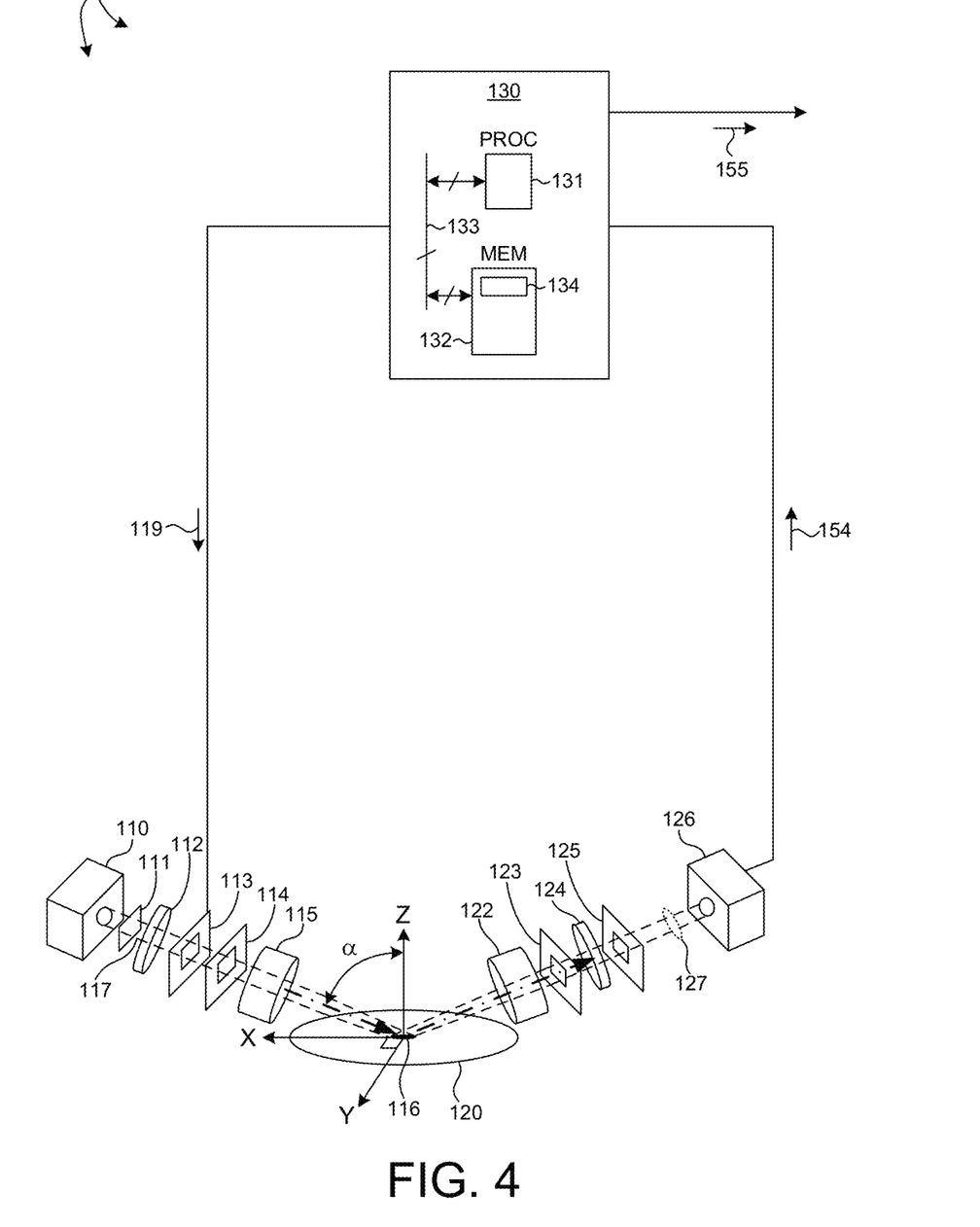
FIG. 4 depicts an exemplary metrology system 100 for performing broadband infrared spectroscopic ellipsometry measurements of thickness of thick, highly absorbing films.

FIG. 4 depicts an exemplary, metrology system 100 for performing film thickness measurements of a highly absorptive material layer. In some examples, the highly absorptive layer is an amorphous carbon layer employed in the manufacture of high aspect ratio (HAR) structures, such as 3-D memory structures. As depicted in FIG. 4, metrology system 100 is configured as a broadband spectroscopic ellipsometer. However, in general, metrology system 100 may be configured as a spectroscopic reflectometer, scatterometer, ellipsometer, or any combination thereof.

Metrology system 100 includes an illumination source 110 that generates a beam of illumination light 117 incident on a wafer 120. In some embodiments, illumination source 110 is a broadband illumination source that emits illumination light in the ultraviolet, visible, and infrared spectra. In one embodiment, illumination source 110 is a laser sustained plasma (LSP) light source (a.k.a., laser driven plasma source). The pump laser of the LSP light source may be continuous wave or pulsed. A laser-driven plasma source can produce significantly more photons than a Xenon lamp across the entire wavelength range from 150 nanometers to 2000 nanometers. Illumination source 110 can be a single light source or a combination of a plurality of broadband or discrete wavelength light sources. The light generated by illumination source 110 includes a continuous spectrum or parts of a continuous spectrum, from ultraviolet to infrared (e.g., vacuum ultraviolet to mid infrared). In general, illumination light source 110 may include a super continuum laser source, an infrared helium-neon laser source, an arc lamp, or any other suitable light source.

In a further aspect, the amount of illumination light is broadband illumination light that includes a range of wavelengths spanning at least 500 nanometers. In one example, the broadband illumination light includes wavelengths below 250 nanometers and wavelengths above 750 nanometers. In general, the broadband illumination light includes wavelengths between 120 nanometers and 3,000 nanometers. In some embodiments, broadband illumination light including wavelengths beyond 3,000 nanometers may be employed. In some examples, broadband illumination light includes wavelengths up to 5,000 nanometers.

As depicted in FIG. 1, metrology system 100 includes an illumination subsystem configured to direct illumination light 117 to one or more structures formed on the wafer 120. The illumination subsystem is shown to include light source 110, one or more optical filters 111, polarizing component 112, field stop 113, aperture stop 114, and illumination optics 115. The one or more optical filters 111 are used to control light level, spectral output, or both, from the illumination subsystem. In some examples, one or more multi-zone filters are employed as optical filters 111. Polarizing component 112 generates the desired polarization state exiting the illumination subsystem. In some embodiments, the polarizing component is a polarizer, a compensator, or both, and may include any suitable commercially available polarizing component. The polarizing component can be fixed, rotatable to different fixed positions, or continuously rotating. Although the illumination subsystem depicted in FIG. 1 includes one polarizing component, the illumination subsystem may include more than one polarizing component. Field stop 113 controls the field of view (FOV) of the illumination subsystem and may include any suitable commercially available field stop. Aperture stop 114 controls the numerical aperture (NA) of the illumination subsystem and may include any suitable commercially available aperture stop. Light from illumination source 110 is directed through illumination optics 115 to be focused on one or more structures on wafer 120, such as stack structure 160 depicted in FIG. 1. The illumination subsystem may include any type and arrangement of optical filter(s) 111, polarizing component 112, field stop 113, aperture stop 114, and illumination optics 115 known in the art of spectroscopic ellipsometry, reflectometry, and scatterometry.

As depicted, in FIG. 1, the beam of illumination light 117 passes through optical filter(s) 111, polarizing component 112, field stop 113, aperture stop 114, and illumination optics 115 as the beam propagates from the illumination source 110 to wafer 120. Beam 117 illuminates a portion of wafer 120 over a measurement spot 116.

Metrology system 100 also includes a collection optics subsystem configured to collect light generated by the interaction between the one or more structures and the incident illumination beam 117. A beam of collected light 127 is collected from measurement spot 116 by collection optics 122. Collected light 127 passes through collection aperture stop 123, polarizing element 124, and field stop 125 of the collection optics subsystem.

Collection optics 122 includes any suitable optical elements to collect light from the one or more structures formed on wafer 120. Collection aperture stop 123 controls the NA of the collection optics subsystem. Polarizing element 124 analyzes the desired polarization state. The polarizing element 124 is a polarizer or a compensator. The polarizing element 124 can be fixed, rotatable to different fixed positions, or continuously rotating. Although the collection subsystem depicted in FIG. 1 includes one polarizing element, the collection subsystem may include more than one polarizing element. Collection field stop 125 controls the field of view of the collection subsystem. The collection subsystem takes light from wafer 120 and directs the light through collection optics 122, and polarizing element 124 to be focused on collection field stop 125. In some embodiments, collection field stop 125 is used as a spectrometer slit for the spectrometers of the detection subsystem. However, collection field stop 125 may be located at or near a spectrometer slit of the spectrometers of the detection subsystem.

The collection subsystem may include any type and arrangement of collection optics 122, aperture stop 123, polarizing element 124, and field stop 125 known in the art of spectroscopic ellipsometry, reflectometry, and scatterometry.

In the embodiment depicted in FIG. 4, the collection optics subsystem directs light to spectrometer 126. Spectrometer 126 generates output responsive to light collected from the one or more structures illuminated by the illumination subsystem. In one example, the detectors of spectrometer 126 are charge coupled devices (CCD) sensitive to ultraviolet and visible light (e.g., light having wavelengths between 190 nanometers and 860 nanometers). In other examples, one or more of the detectors of spectrometer 126 is a photo detector array (PDA) sensitive to infrared light (e.g., light having wavelengths between 950 nanometers and 2500 nanometers). However, in general, other detector technologies may be contemplated (e.g., a position sensitive detector (PSD), an infrared detector, a photovoltaic detector, etc.). Each detector converts the incident light into electrical signals indicative of the spectral intensity of the incident light. In general, spectrometer 126 generates output signals 154 indicative of the spectral response of the structure under measurement to the illumination light.

Metrology system 100 also includes computing system 130 configured to receive signals 154 indicative of the measured spectral response of the structure of interest and estimate values of the film thickness of a highly absorbing film layer of the measured structure based on the measured spectral response.

Figure 5:
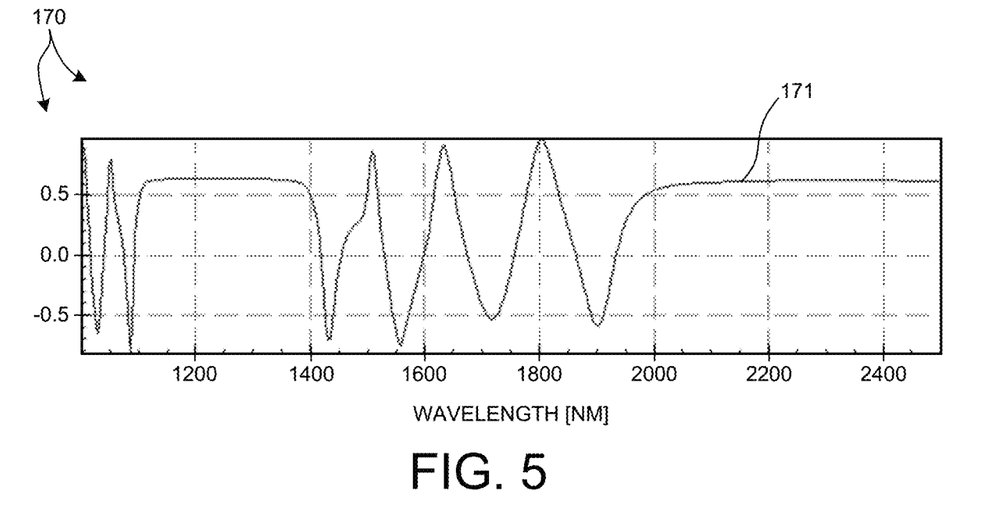
FIG. 5 depicts a plot 170 illustrative of a simulation of a α spectrum 171 as measured by a SE metrology system such as metrology system 100 depicted in FIG. 4.
Figure 6:
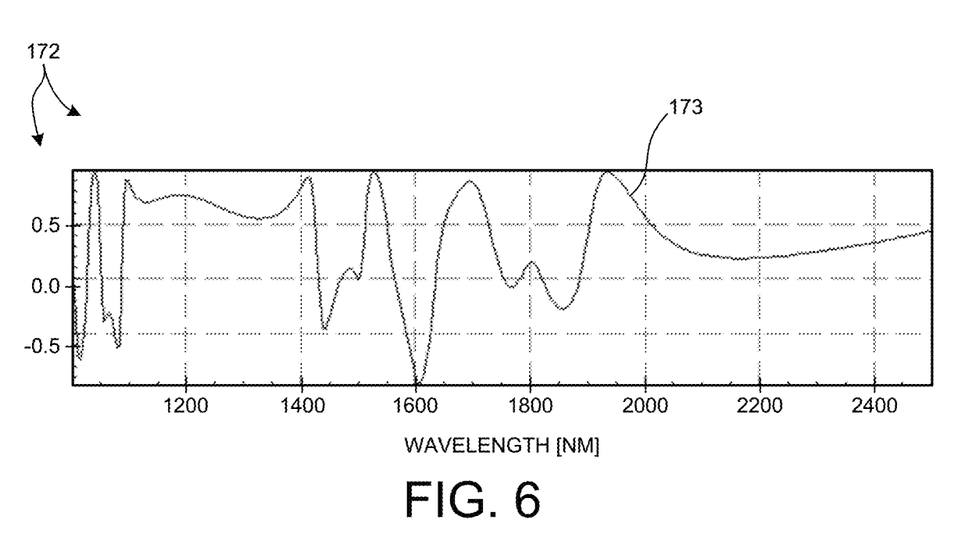
FIG. 6 depicts a plot 172 illustrative of a simulation of a β spectrum 173 as measured by a SE metrology system such as metrology system 100 depicted in FIG. 4.

FIG. 5 depicts a plot 170 illustrative of a simulation of a $\alpha$ spectrum 171 as measured by a SE metrology system such as metrology system 100 depicted in FIG. 4. FIG. 6 depicts a plot 172 illustrative of a simulation of a $\beta$ spectrum 173 as measured by a SE metrology system such as metrology system 100 depicted in FIG. 4. The simulation involves an SE measurement of structure 160 depicted in FIG. 1, where all of the $SiO_2$ material layers and amorphous silicon layers are 2500 nanometers thick, and the amorphous carbon layer is approximately 1.8 micrometers thick.

As depicted in FIG. 5, the $\alpha$ spectrum 171 exhibits flatness in a wavelength range between approximately 1,100 nanometers and 1,400 nanometers and in a wavelength range between approximately 2,000 nanometers and 2,500 nanometers. These spectral regions indicate optical resonance (i.e., combined constructive interference) from the periodic film stack. In these wavelength regions the periodic film stack is exhibiting mirror-like behavior. As a result, measurement sensitivity is higher in these regions. It is preferable to perform a spectroscopic measurement of thickness of an amorphous carbon layer with illumination including wavelengths in a range between approximately 2,000 nanometers and 2,500 nanometers because measurement sensitivity is high and the absorption of illumination light in this range of wavelengths by the amorphous carbon layer is less than the absorption of illumination light at shorter wavelengths.

Figure 7:
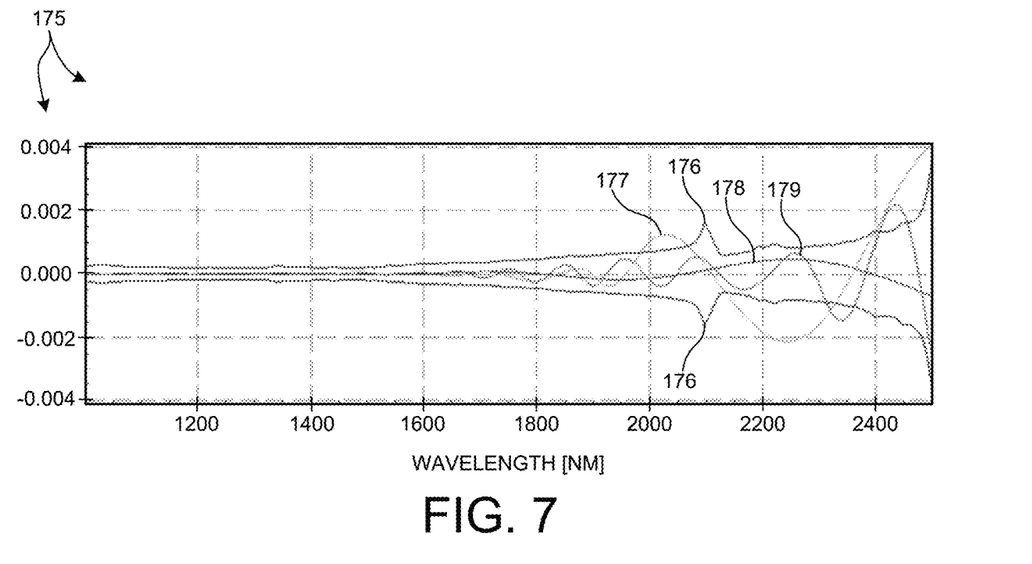
FIG. 7 depicts a plot 175 illustrative of simulation of measurement sensitivities associated with the α spectral response of a thick amorphous carbon layer (e.g., approximately 1.8 micrometers thick) fabricated over a number of different structures.

FIG. 7 depicts a plot 175 illustrative of simulation of measurement sensitivities associated with the $\alpha$ spectral response of a thick amorphous carbon layer (e.g., approximately 1.8 micrometers thick) fabricated over a number of different structures. Plotline 178 depicts the measurement sensitivity associated with the $\alpha$ spectral response of the amorphous carbon layer fabricated directly onto a silicon substrate. Plotline 179 depicts the measurement sensitivity associated with the $\alpha$ spectral response of the amorphous carbon layer fabricated directly on typical product stacks, which are, in turn, fabricated on a silicon substrate. The product layers have typical thicknesses of approximately 200-300 nanometers. Plotline 177 depicts the measurement sensitivity associated with the $\alpha$ spectral response of the amorphous carbon layer fabricated directly on repeating layer sets as depicted in FIG. 1, which are, in turn, fabricated on a silicon substrate as depicted in FIG. 1, where all of the $SiO_2$ material layers and amorphous silicon layers are 2500 nanometers thick. Plotline 176 depicts the noise error induced by the SE measurement. As depicted in plotline 178, the measurement sensitivity associated with the SE measurement of the amorphous carbon layer directly on the silicon substrate is within the noise floor of the SE measurement system for the entire wavelength range. As depicted in plotline 177, the measurement sensitivity associated with the α spectral response of the amorphous carbon layer fabricated directly on typical product stacks is also within the noise floor of the SE measurement system for the most of the simulated wavelength range. As depicted in plotline 179, the measurement sensitivity associated with the α spectral response of the amorphous carbon layer fabricated directly on repeating layer sets as depicted in FIG. 1 substantially exceeds the noise floor of the SE measurement system for wavelengths above approximately 2,000 nanometers.

Figure 8:
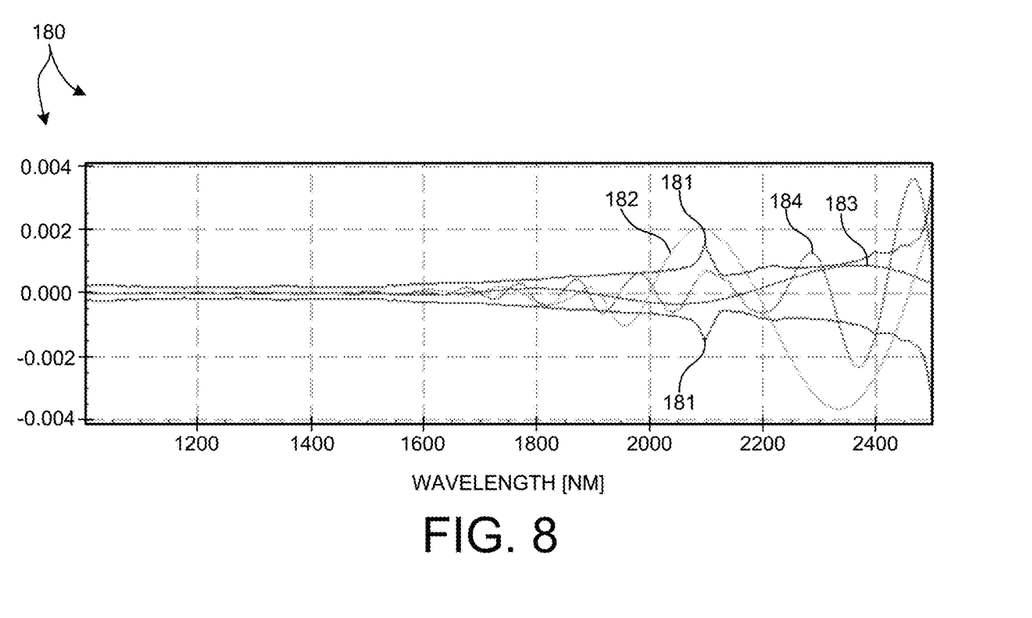
FIG. 8 depicts a plot 180 illustrative of simulation of measurement sensitivities associated with the β spectral response of a thick amorphous carbon layer (e.g., approximately 1.8 micrometers thick) fabricated over a number of different structures.

FIG. 8 depicts a plot 180 illustrative of simulation of measurement sensitivities associated with the β spectral response of a thick amorphous carbon layer (e.g., approximately 1.8 micrometers thick) fabricated over a number of different structures. Plotline 183 depicts the measurement sensitivity associated with the β spectral response of the amorphous carbon layer fabricated directly onto a silicon substrate. Plotline 184 depicts the measurement sensitivity associated with the β spectral response of the amorphous carbon layer fabricated directly on typical product stacks, which are, in turn, fabricated on a silicon substrate. The product layers have typical thicknesses of approximately 200-300 nanometers. Plotline 182 depicts the measurement sensitivity associated with the β spectral response of the amorphous carbon layer fabricated directly on repeating layer sets as depicted in FIG. 1, which are, in turn, fabricated on a silicon substrate as depicted in FIG. 1, where all of the $SiO_2$ material layers and amorphous silicon layers are 2500 nanometers thick. Plotline 181 depicts the noise error induced by the SE measurement. As depicted in plotline 183, the measurement sensitivity associated with the SE measurement of the amorphous carbon layer directly on the silicon substrate is within the noise floor of the SE measurement system for the entire wavelength range. As depicted in plotline 184, the measurement sensitivity associated with the β spectral response of the amorphous carbon layer fabricated directly on typical product stacks is also within the noise floor of the SE measurement system for the most of the simulated wavelength range. As depicted in plotline 182, the measurement sensitivity associated with the β spectral response of the amorphous carbon layer fabricated directly on repeating layer sets as depicted in FIG. 1 substantially exceeds the noise floor of the SE measurement system for wavelengths above approximately 2,000 nanometers.

As illustrated by plots 175 and 180, SE measurement sensitivity is significantly larger for a thick, highly absorbing film on a highly reflective repeating film stack. Measurement uncertainty associated with the measurement of the amorphous carbon layer deposited on the highly reflective film stack is expected to be approximately 44% less than the measurement uncertainty associated with the measurement of the amorphous carbon layer deposited on a typical product stack. Also, as illustrated by plots 175 and 180, the measurement sensitivity associated with the measurement of the amorphous carbon layer deposited directly on a silicon substrate is too low for stable measurement (i.e., the measurement sensitivity is less than the noise envelope over the entire spectra).

Figure 9:
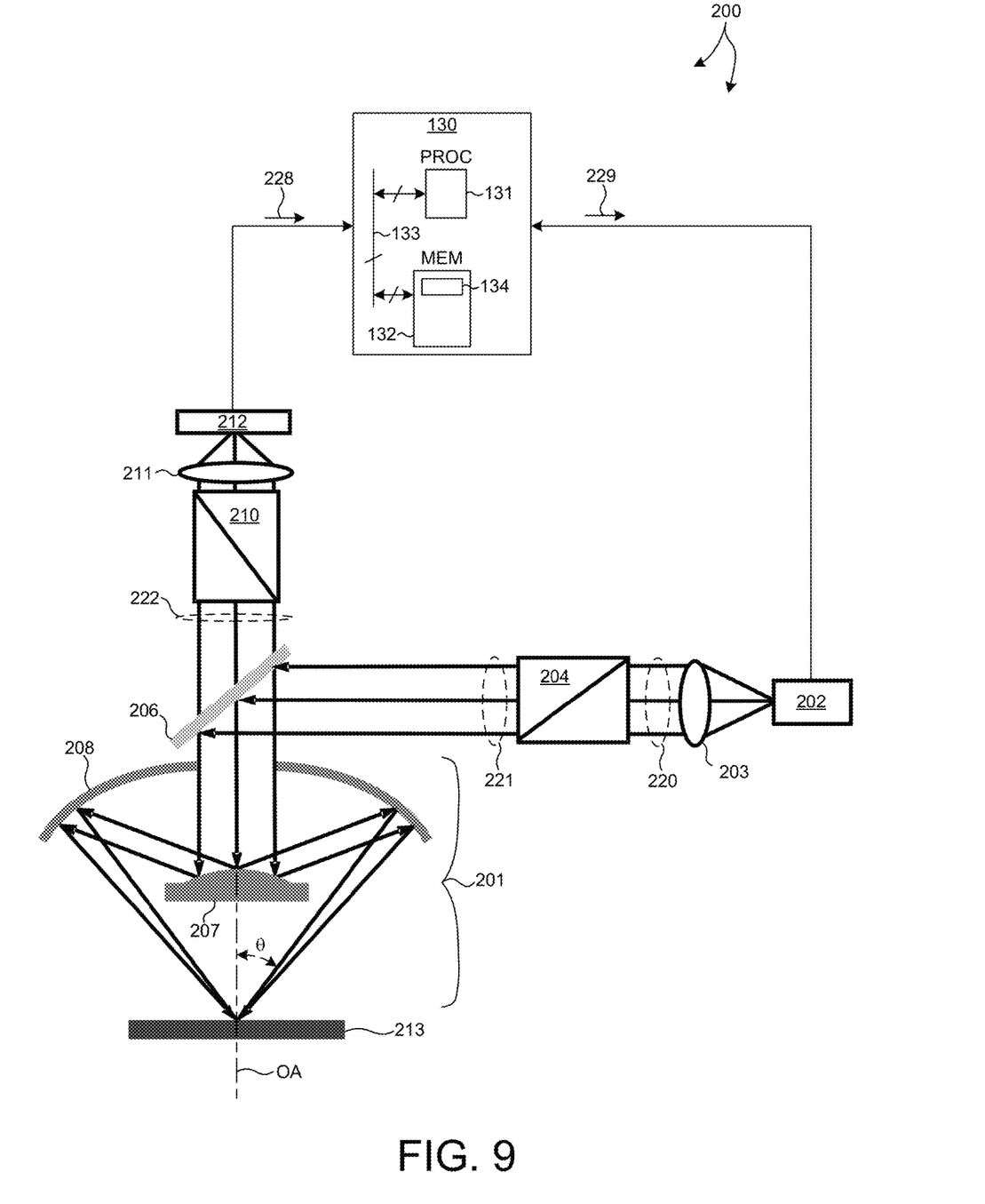
FIG. 9 depicts an exemplary metrology system 200 for performing broadband infrared spectroscopic reflectometry thickness measurements of thick, highly absorbing film layers.

FIG. 9 depicts an exemplary, metrology system 200 for performing film thickness measurements of a highly absorptive material layer. As depicted in FIG. 9, metrology system 200 is configured as a broadband spectroscopic reflectometer.

FIG. 9 depicts an infrared spectroscopic reflectometer including one or more measurement channels spanning a wavelength range between 750 nanometers and 2600 nanometers in one embodiment. In one aspect, infrared spectroscopic reflectometer 200 includes a Schwartzchild objective to avoid normal incidence. Like numbered elements illustrated in FIG. 9 are analogous to those described with reference to FIG. 4.

Infrared spectroscopic reflectometer 200 includes polarizer 204, objective 201, analyzer 210, and spectrometer 212. As depicted in FIG. 9, a light beam is generated by the illumination source 202 in response to command signals received from computing system 130. Light from illumination source 202 is conditioned by optional beam forming optics 203 to generate an illumination light beam 220. Illumination light beam 220 is directed to polarizer 204. Although, as depicted, illumination light directed to polarizer 204 comes from illumination source 202, in general, light from any of the illumination sources of system 100 may be combined to generate an illumination light beam directed to polarizer 204. In this manner, the spectral components of the illumination light can be configured as a combination of light emitted from multiple illumination sources.

In some embodiments, polarizer 204 is configured to selectively rotate a polarizing element about the optical axis of the illumination light beam 220. In general, polarizer 204 may include any polarizing element and system to rotate the polarizing element known in the art. For example, the polarizer 204 may include a polarizing element mechanically coupled to a rotational actuator. In one example, the polarizing element may be a Rochon prism. In another example, the polarizing element may include a beam displacer. Polarizer 204 is configured to operate within system 200 in either a rotationally active or rotationally inactive state. In one instance, a rotational actuator of polarizer 204 may be inactive such that the polarizing element remains rotationally fixed about the optical axis of illumination light 220. In another instance, the rotational actuator may rotate the polarizing element at a selected angular frequency, □p, about the optical axis of the illumination light.

In some other embodiments, polarizer 204 is configured with a fixed polarization angle about the optical axis of the illumination light beam 220.

As depicted in FIG. 9, illumination light beam 220 passes through polarizer 204 while the rotational actuator rotates the polarizing element at the selected angular frequency, $\omega_p$. In this manner, polarizer 204 generates a polarized light beam 221 directed toward beamsplitter 206. Beamsplitter 206 directs the polarized light beam 221 towards objective 201.

In the embodiment depicted in FIG. 9, objective 201 is a Schwartzschild type objective including reflective optical elements only. The Schwartzschild objective depicted in FIG. 9 includes a concave mirror 208 with an opening (e.g., hole) aligned with the optical axis, OA, to allow light to pass in and out of the objective 201. Incoming light passes through the opening, and reflects off convex mirror 207 toward concave mirror 208. The reflected light is focused on the surface of wafer 212 by concave mirror 208. The polarized light beam 221 is focused onto the surface of wafer 212 over a range of angles of incidence by objective 201, but not at a zero angle of incidence (i.e., normal to the surface of wafer 212). In some examples, polarized light beam 221 is focused onto the surface of wafer 212 within a range of angles of incidence between 5 and 40 degrees. In some other examples, polarized light beam 221 is focused onto the surface of wafer 212 within a range of angles of incidence between 5 and 25 degrees. In some examples, a portion of polarized light beam 221 is focused onto the surface of wafer 212 at an angle of incidence less than 20 degrees. In some other examples, a portion of polarized light beam 221 is focused onto the surface of wafer 212 at an angle of incidence less than 15 degrees. In some examples, the polarized light beam 221 is focused onto the surface of wafer 212 at small angles of incidence results in a small illumination spot. In some examples, the resulting illumination spot is less than 20 micrometers in diameter. In some other examples, the resulting illumination spot size is less than 10 micrometers in diameter.

The interaction of the focused, polarized light beam 221 with wafer 212 modifies the polarization of the radiation by any of reflection, scattering, diffraction, transmission, or other types of processes. After interaction with the wafer 212, modified light 222 is collected by objective 201 and directed to beamsplitter 206. Light from wafer 212 is collected by concave mirror 208 and focused onto convex mirror 207 where it exits the Schwartzschild objective through the same hole as the incoming light toward beamsplitter 206. Beamsplitter 206 is configured to transmit modified light 222 toward analyzer 210. In the embodiment depicted in FIG. 9, analyzer 210 includes a polarizer element that remains rotationally fixed about the optical axis of modified light beam 222 while the modified light beam 222 passes through the analyzer 210 and optional beam focusing optics 211 to spectrometer 212. In spectrometer 212, the beam components having different wavelengths are refracted (e.g., in a prism spectrometer) or diffracted (e.g., in a grating spectrometer) in different directions to different detectors. The detectors may be a linear array of photodiodes, with each photodiode measuring radiation in a different wavelength range. The radiation received by the spectrometer 212 is analyzed with regard to polarization state, allowing for spectral analysis by the spectrometer of radiation passed by the polarizer 212. The measured spectra 228 are communicated to computing system 130. Computing system 130 is configured to receive signals 228 indicative of the measured spectral response of the structure of interest and estimate values of the film thickness of a highly absorbing film layer of the measured structure based on the measured spectral response.

Figure 10:
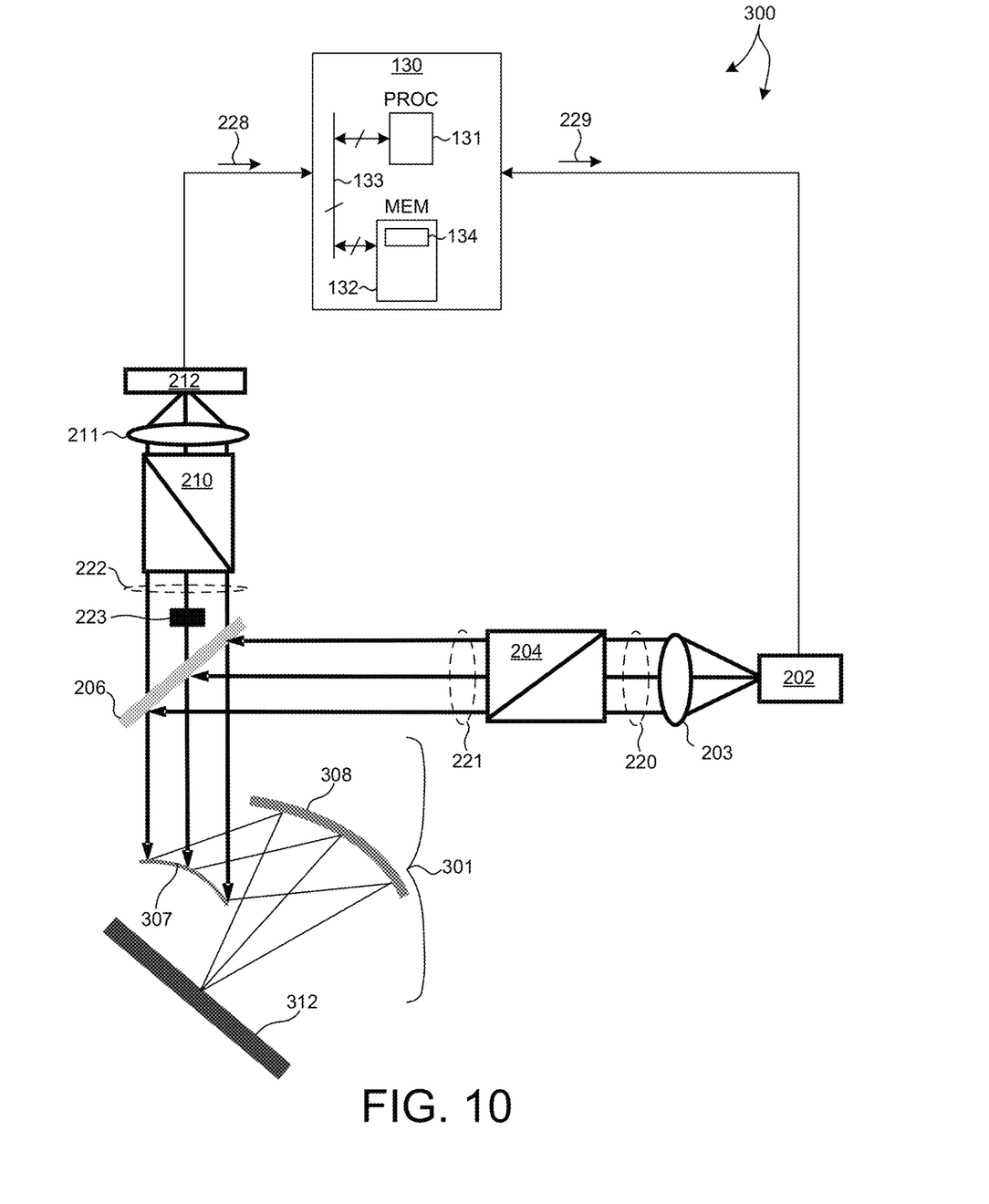
FIG. 10 depicts an exemplary metrology system 300 for performing broadband infrared spectroscopic reflectometry thickness measurements of thick, highly absorbing film layers.

FIG. 10 depicts an infrared spectroscopic reflectometer including one or more measurement channels spanning a wavelength range between 750 nanometers and 2600 nanometers in another embodiment. In one aspect, infrared spectroscopic reflectometer 300 includes an off-axis unobscured objective lens 301 to achieve oblique incidence. Like numbered elements illustrated in FIG. 10 are analogous to those described with reference to FIGS. 4 and 9.

Infrared spectroscopic reflectometer 300 is analogous to infrared spectroscopic reflectometer 200 described with reference to FIG. 9. However, instead of a Schwartzchild objective, an off-axis unobscured objective lens 301 is employed. Incoming light reflects off convex mirror 307 toward concave mirror 308. The reflected light is focused on the surface of wafer 312 by concave mirror 308. The polarized light beam 221 is focused onto the surface of wafer 312 over a range of angles of incidence by objective 301. In some examples, polarized light beam 221 is focused onto the surface of wafer 312 within a range of angles of incidence between 5 and 40 degrees. In some other examples, polarized light beam 221 is focused onto the surface of wafer 212 within a range of angles of incidence between 5 and 25 degrees. In some examples, a portion of polarized light beam 221 is focused onto the surface of wafer 312 at an angle of incidence less than 20 degrees. In some other examples, a portion of polarized light beam 221 is focused onto the surface of wafer 312 at an angle of incidence less than 15 degrees. Polarized light beam 221 is focused onto the surface of wafer 312 at small angles of incidence results in a small illumination spot. In some examples, the resulting illumination spot is less than 20 micrometers in diameter. In some other examples, the resulting illumination spot size is less than 10 micrometers in diameter.

The interaction of the focused, polarized light beam 221 with wafer 312 modifies the polarization of the radiation by any of reflection, scattering, diffraction, transmission, or other types of processes. After interaction with the wafer 312, modified light 222 is collected by objective 301 and directed to beamsplitter 206. Light from wafer 312 is collected by concave mirror 308 and focused onto convex mirror 307 where it is collimated and exits objective 301 toward beamsplitter 206. In some other examples, a collection mask having a central obscuration, such as mask 223 depicted in FIG. 10, is located at or near the collection pupil.

As depicted in FIGS. 6, 9, and 10, the illustrated measurement channel includes a polarizer on the illumination side and an analyzer on the collection side. However, in general, it is contemplated that any measurement channel may include, or not include, an illumination polarizer, a collection analyzer, an illumination compensator, a collection compensator, in any combination, to perform measurements of the polarized reflectivity of the sample, unpolarized reflectivity of the sample, or both.

As depicted in FIGS. 9 and 10, the illustrated spectroscopic reflectometers are configured to illuminate the specimen at oblique angles. However, in general, it is contemplated that any spectroscopic reflectometer may illuminate the specimen at normal angles of incidence to perform film thickness measurements as described herein.

In a further aspect, a metrology system incorporating an infrared spectroscopic reflectometer or ellipsometer as described herein may also include one or more additional measurement channels operating in the wavelength range between 150 nanometers and 2000 nanometers. These measurement channels may be configured as spectroscopic reflectometers, ellipsometers, scatterometers, or any combination thereof.

In some embodiments, a metrology system incorporates one or more infrared spectroscopic reflectometer measurement channels, one or more infrared spectroscopic ellipsometer channels, or both, as described herein that operate in the wavelength range between 750 nanometers and 2600 nanometers. In addition, the metrology system includes one or more additional channels including, but not limited to at least on UV to near IR spectrometer channel utilizing a UV to near IR detector, such as a CCD sensor measuring in the wavelength range from 190 nanometers to 900 nanometers, at least one vacuum UV spectrometer channel utilizing a vacuum UV CCD sensor measuring in the wavelength range from 150 nanometers to 300 nanometers, at least one mid IR spectrometer channel measuring in the wavelength range between 2500 nanometers to 4500 nanometers, or any combination thereof. In some of these embodiments, the measurement spots of the various spectrometers are co-located. In some other embodiments, the measurement spots are not co-located.

In some embodiments, one or more measurement channels of the metrology system are configured to measure the wafer at different azimuth angles, different angles of incidence, or both, in addition to different ranges of wavelength. In some embodiments, the metrology system is configured to measure wafer reflectivity over one or more wavelength ranges, one or more AOI ranges, and one or more azimuth angles simultaneously.

In another further aspect, the dimensions of illumination field stop projected on wafer plane are adjusted to optimize the resulting measurement accuracy and speed based on the nature of target under measurement.

In another further aspect, the dimensions of illumination field stop are adjusted to achieve the desired spectral resolution for each measurement application.

In some examples, e.g., if the sample is a very thick film or grating structure, the illumination field stop projected on wafer plane in the direction perpendicular to the plane of incidence is adjusted to reduce the field size to achieve increase spectral resolution. In some examples, e.g., if the sample is a thin film, the illumination field stop projected on wafer plane in the direction perpendicular to the plane of incidence is adjusted to increase the field size to achieve a shortened measurement time without losing spectral resolution.

In the embodiment depicted in FIG. 4, computing system 130 is configured to receive signals 154 indicative of the spectral response detected by the detector subsystem. Computing system 130 is further configured to determine control signals 119 that are communicated to programmable illumination field stop 113. Programmable illumination field stop 113 receives control signals 119 and adjusts the size of the illumination aperture to achieve the desired illumination field size.

In some examples, the illumination field stop is adjusted to optimize measurement accuracy and speed as described hereinbefore. In another example, the illumination field stop is adjusted to prevent image clipping by the spectrometer slit and corresponding degradation of measurement results. In this manner, the illumination field size is adjusted such that the image of the measurement target underfills the spectrometer slit. In one example, the illumination field stop is adjusted such that the projection of the polarizer slit of the illumination optics underfills the spectrometer slit of the metrology system.

Figure 11:
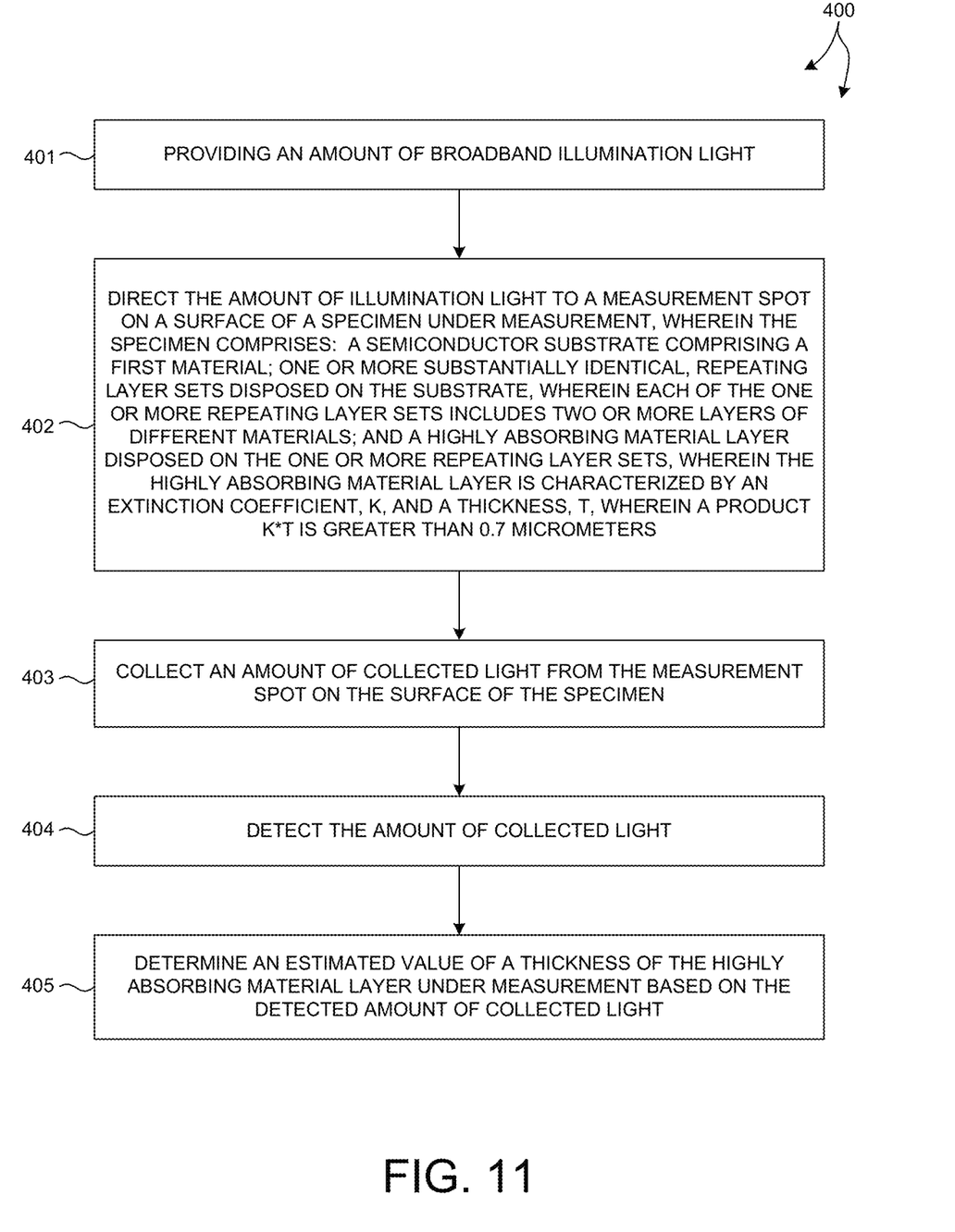
FIG. 11 illustrates a method 400 of performing an optical film thickness measurement of a thick, highly absorbing film layer.

FIG. 11 illustrates a method 400 of performing spectroscopic measurements in at least one novel aspect. Method 400 is suitable for implementation by a metrology system such as metrology systems 100, 200, and 300 illustrated in FIGS. 4, 9, and 10, respectively, of the present invention. In one aspect, it is recognized that data processing blocks of method 400 may be carried out via a pre-programmed algorithm executed by one or more processors of computing system 130, or any other general purpose computing system. It is recognized herein that the particular structural aspects of metrology systems 100, 200, and 300 do not represent limitations and should be interpreted as illustrative only.

In block 401, an amount of broadband illumination light is provided to a specimen under measurement.

In block 402, the amount of illumination light is directed to a measurement spot on a surface of the specimen under measurement. The specimen includes a semiconductor substrate comprising a first material; one or more substantially identical, repeating layer sets disposed on the substrate; and a highly absorbing material layer disposed on the one or more repeating layer sets. The highly absorbing material layer is characterized by an extinction coefficient, K, and a thickness, T, wherein a product K*T is greater than 0.7 micrometers. Each of the one or more repeating layer sets includes two or more layers of different materials.

In block 403, an amount of collected light is collected from the measurement spot on the surface of the specimen.

In block 404, the amount of collected light is detected.

In block 405, an estimated value of a thickness of the highly absorbing material layer under measurement is determined based on the detected amount of collected light.

In a further embodiment, systems 100, 200, and 300 include one or more computing systems 130 employed to perform measurements of film structures based on spectroscopic measurement data collected in accordance with the methods described herein. The one or more computing systems 130 may be communicatively coupled to the spectrometer. In one aspect, the one or more computing systems 130 are configured to receive measurement data associated with measurements of the structure of the specimen under measurement.

It should be recognized that one or more steps described throughout the present disclosure may be carried out by a single computer system 130 or, alternatively, a multiple computer system 130. Moreover, different subsystems of system 100 may include a computer system suitable for carrying out at least a portion of the steps described herein. Therefore, the aforementioned description should not be interpreted as a limitation on the present invention but merely an illustration.

In addition, the computer system 130 may be communicatively coupled to the spectrometers in any manner known in the art. For example, the one or more computing systems 130 may be coupled to computing systems associated with the spectrometers. In another example, the spectrometers may be controlled directly by a single computer system coupled to computer system 130.

The computer system 130 of metrology system 100 may be configured to receive and/or acquire data or information from the subsystems of the system (e.g., spectrometers and the like) by a transmission medium that may include wireline and/or wireless portions. In this manner, the transmission medium may serve as a data link between the computer system 130 and other subsystems of system 100.

Computer system 130 of metrology system 100 may be configured to receive and/or acquire data or information (e.g., measurement results, modeling inputs, modeling results, reference measurement results, etc.) from other systems by a transmission medium that may include wireline and/or wireless portions. In this manner, the transmission medium may serve as a data link between the computer system 130 and other systems (e.g., memory on-board metrology system 100, external memory, or other external systems). For example, the computing system 130 may be configured to receive measurement data from a storage medium (i.e., memory 132 or an external memory) via a data link. For instance, spectral results obtained using the spectrometers described herein may be stored in a permanent or semi-permanent memory device (e.g., memory 132 or an external memory). In this regard, the spectral results may be imported from on-board memory or from an external memory system. Moreover, the computer system 130 may send data to other systems via a transmission medium. For instance, a measurement model or an estimated parameter value 155 determined by computer system 130 may be communicated and stored in an external memory. In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions 134 stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

In some examples, the measurement models are implemented as an element of a SpectraShape® optical critical-dimension metrology system available from KLA-Tencor Corporation, Milpitas, Calif., USA. In this manner, the model is created and ready for use immediately after the spectra are collected by the system.

In some other examples, the measurement models are implemented off-line, for example, by a computing system implementing AcuShape® software available from KLA-Tencor Corporation, Milpitas, Calif., USA. The resulting, trained model may be incorporated as an element of an AcuShape® library that is accessible by a metrology system performing measurements.

In yet another aspect, the measurement results described herein can be used to provide active feedback to a process tool (e.g., lithography tool, etch tool, deposition tool, etc.). For example, values of measured film thickness parameters determined based on measurement methods described herein can be communicated to a lithography tool to adjust the lithography system to achieve a desired output. In a similar way etch parameters (e.g., etch time, diffusivity, etc.) or deposition parameters (e.g., time, concentration, etc.) may be corrected based on active feedback of the measured film thickness to etch tools or deposition tools, respectively. In some examples, corrections to process parameters determined based on measured film thickness may be communicated to a lithography tool, etch tool, or deposition tool.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the metrology systems described herein may be configured for measurement of patterned wafers and/or unpatterned wafers. The metrology systems may be configured as a LED inspection tool, edge inspection tool, backside inspection tool, macro-inspection tool, or multi-mode inspection tool (involving data from one or more platforms simultaneously), and any other metrology or inspection tool that benefits from the calibration of system parameters based on critical dimension data.

Various embodiments are described herein for a semiconductor measurement system that may be used for measuring a specimen within any semiconductor processing tool (e.g., an inspection system or a lithography system). The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous SiO2. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An optical metrology system comprising:
one or more illumination sources configured to generate an amount of broadband illumination light;
an illumination optics subsystem configured to direct the amount of illumination light from the illumination source to a measurement spot on a surface of a specimen under measurement, wherein the specimen comprises:
a semiconductor substrate comprising a first material;
one or more substantially identical, repeating layer sets disposed on the substrate, wherein each of the one or more repeating layer sets includes two or more layers of different materials; and
a highly absorbing material layer disposed on the one or more repeating layer sets, wherein the highly absorbing material layer is characterized by an extinction coefficient, K, and a thickness, T, wherein a product K*T is greater than 0.7 micrometers;
a collection optics subsystem configured to collect an amount of collected light from the measurement spot on the surface of the specimen;
a detector configured to detect the amount of collected light and generate an output signal indicative of the detected light; and
a computing system configured to generate an estimated value of a thickness of the highly absorbing material layer under measurement based on the output of the detector.

2. The optical metrology system of claim 1, wherein the metrology system is configured as any of a spectroscopic ellipsometer and a spectroscopic reflectometer.

3. The optical metrology system of claim 1, wherein the illumination includes wavelengths in a range between 1000 nanometers and 2500 nanometers.

4. The optical metrology system of claim 1, wherein the one or more substantially identical, repeating layer sets disposed on the substrate includes at least four substantially identical, repeating layer sets.

5. The optical metrology system of claim 1, wherein each first layer of each layer set and each second layer of each layer set is the same thickness.

6. The optical metrology system of claim 1, wherein a thickness of a first layer of each layer set is greater than 1,500 nanometers and a thickness of a second layer of each layer set is greater than 1,500 nanometers.

7. The optical metrology system of claim 1, wherein each of the one or more layer sets includes a first material layer and a second material layer, wherein the first material layer is an oxide material layer, and wherein the second material layer is a nitride material layer or an amorphous silicon material layer.

8. A semiconductor wafer comprising:
a semiconductor substrate comprising a first material;
one or more substantially identical layer sets disposed on the substrate, wherein each of the one or more layer sets includes two or more layers of different materials, and wherein each of the two or more layers has a thickness greater than 500 nanometers; and
a highly absorbing material layer disposed on the one or more substantially identical layer sets, wherein the highly absorbing material layer is characterized by an extinction coefficient, K, and a thickness, T, wherein a product K*T is greater than 0.7 micrometers.

9. The semiconductor wafer of claim 8, wherein the one or more substantially identical, repeating layer sets disposed on the substrate includes at least four substantially identical, repeating layer sets.

10. The semiconductor wafer of claim 8, wherein each first layer of each layer set and each second layer of each layer set is the same thickness.

11. The semiconductor wafer of claim 8, wherein a thickness of a first layer of each layer set is greater than 1,500 nanometers and a thickness of a second layer of each layer set is greater than 1,500 nanometers.

12. The semiconductor wafer of claim 8, wherein each of the one or more layer sets includes a first material layer and a second material layer, wherein the first material layer is an oxide material layer, and wherein the second material layer is a nitride material layer or an amorphous silicon material layer.

13. The semiconductor wafer of claim 12, wherein the highly absorbing material layer is an amorphous carbon material layer.

14. A method comprising:
providing an amount of broadband illumination light;
directing the amount of illumination light to a measurement spot on a surface of a specimen under measurement, wherein the specimen comprises:
a semiconductor substrate comprising a first material;
one or more substantially identical, repeating layer sets disposed on the substrate, wherein each of the one or more repeating layer sets includes two or more layers of different materials; and
a highly absorbing material layer disposed on the one or more repeating layer sets, wherein the highly absorbing material layer is characterized by an extinction coefficient, K, and a thickness, T, wherein a product K*T is greater than 0.7 micrometers;
collecting an amount of collected light from the measurement spot on the surface of the specimen;
detecting the amount of collected light; and
determining an estimated value of a thickness of the highly absorbing material layer under measurement based on the detected amount of collected light.

15. The method of claim 14, wherein the broadband illumination light includes wavelengths in a range between 1000 nanometers and 2500 nanometers.

16. The method of claim 14, wherein the one or more substantially identical, repeating layer sets disposed on the substrate includes at least four substantially identical, repeating layer sets.

17. The method of claim 14, wherein each first layer of each layer set and each second layer of each layer set is the same thickness.

18. The method of claim 14, wherein a thickness of a first layer of each layer set is greater than 1,500 nanometers and a thickness of a second layer of each layer set is greater than 1,500 nanometers.

19. The method of claim 14, wherein each of the one or more layer sets includes a first material layer and a second material layer, wherein the first material layer is an oxide material layer, and wherein the second material layer is a nitride material layer or an amorphous silicon material layer.

20. The method of claim 19, wherein the highly absorbing material layer is an amorphous carbon material layer.

* * * * *